United States Patent [19]
Nakahira et al.

[11] Patent Number: 5,631,458
[45] Date of Patent: May 20, 1997

[54] RANGE FINDER

[75] Inventors: Toshiaki Nakahira, Yokohama; Susumu Iguchi; Kazumasa Aoki, both of Kawasaki; Yoshihiko Shimura, Yokohama, all of Japan

[73] Assignee: Ricoh Company, Ltd., Tokyo, Japan

[21] Appl. No.: 552,538

[22] Filed: Nov. 3, 1995

[30] Foreign Application Priority Data

Nov. 12, 1994 [JP] Japan .................... 6-303215

[51] Int. Cl.⁶ .................................. H01J 40/14
[52] U.S. Cl. .................... 250/214 P; 250/214 LS; 327/520
[58] Field of Search .................... 250/214 P, 214 LS, 250/214 C, 201.1, 201.2, 214 SG; 356/4.01; 354/401–403; 327/397, 514, 261, 262, 396, 520

[56] References Cited

U.S. PATENT DOCUMENTS

| | | | |
|---|---|---|---|
| 3,813,680 | 5/1974 | Wagensonner et al. | 250/214 P |
| 4,498,753 | 2/1985 | Mizokami | 250/214 P |

FOREIGN PATENT DOCUMENTS

| | | |
|---|---|---|
| 62-156631 | 7/1987 | Japan . |
| 63-171313 | 7/1988 | Japan . |
| 1-199109 | 8/1989 | Japan . |

*Primary Examiner*—Que Le
*Attorney, Agent, or Firm*—Oblon, Spivak, McClelland, Maier & Neustadt, P.C.

[57] ABSTRACT

In a range finder, a capacitor for light emission is charged by turning off first and second switching elements and turning on third and fourth switching elements before light is emitted from a light emitting diode. A sum of a charging voltage of the capacitor for light emission and the voltage of a direct current power source is applied to the light emitting diode by turning on the first and second switching elements and turning off the third and fourth switching elements when light is emitted from the light emitting diode. At this time, an operation of the second switching element is controlled with a constant electric current by a constant current control circuit constructed by a transistor, a resistor for current limitation, a diode, etc. so that an electric current flowing through the light emitting diode is constant and a light emitting amount of the light emitting diode becomes constant.

11 Claims, 5 Drawing Sheets

RANGE FINDER

BACKGROUND OF THE INVENTION

1. Field of the Invention

The present invention relates to a range finder for obtaining measured distance information by emitting light to a photographed subject and detecting reflected light from the photographed subject in synchronization with the light emission. More particularly, the present invention relates to a device for effectively emitting light from a light emitting element in the range finder used in a camera.

2. Description of the Related Art

A so-called active type range finder is known as a range finder used in a camera. In this active type range finder, measured distance information is obtained by operating a light emitting element, emitting light to a photographed subject, detecting reflected light from the photographed subject and processing this reflected light. A distance from the camera to the photographed subject is detected by this measured distance information.

The range finder of this kind is generally divided into two systems composed of a synchronous detecting system and a one-shot system. In the synchronous detecting system, the light emitting element is intermittently operated and the reflected light is detected in synchronization with this operation of the light emitting element. The reflected light is synchronously integrated so that the distance between the camera and the photographed subject is detected. In the one-shot system, the light emitting element is operated with one shot pulse so that one measured distance information is obtained by one light emission.

An infrared light emitting diode is generally used as the light emitting element. This infrared light emitting diode is operated with a driving electric current of several 100 mA in the synchronous detecting system and a driving electric current of about several A in the one-shot system so as to obtain sufficient light emitting power. In the range finder of the camera, a battery is used as a power source for operating the above infrared light emitting diode.

However, the battery is consumed by use so that a voltage of the power source is reduced.

Further, in a low temperature environment, etc., output resistance of the battery is increased so that it is difficult to output a large electric current having a predetermined voltage. In contrast to this, the number of kinds of infrared light emitting diodes capable of obtaining a sufficient light emitting amount with low voltage is small and the infrared light emitting diodes are expensive.

It is sufficient to set a battery voltage to about 1.5 V to 2.0 V so as to operate an infrared light emitting diode by the synchronous detecting system. However, in the one-shot system, it is necessary to set the battery voltage to be equal to or higher than 2.5 V. Therefore, it is normally difficult to select the infrared light emitting diode to obtain a sufficient light emitting amount in the one-shot system in comparison with the synchronous detecting system. In general, infrared light emitting diodes have no problem in the synchronous detecting system, but have a problem in the one-shot system.

Recently, the focal length of a zoom camera has been increased. Therefore, distance measurement of a photographed subject at a long distance is indispensable to the camera. Light must be suitably emitted to the photographed subject at a long distance so as to precisely measure the long distance. Therefore, it is necessary to fulfill performance of the light emitting element at its maximum in the synchronous detecting system.

The following techniques are generally known as a technique for fulfilling the performance of the light emitting element at its maximum.

(1) The voltage of a low voltage direct current power source is increased by using a DC-DC converter, etc. so that a voltage applied to the light emitting element is increased.

(2) The voltage applied to the light emitting element is increased by using a voltage doubler circuit.

For example, Japanese Patent Application Laying Open (KOKAI) No. 63-171313 shows a technique using the voltage doubler circuit. In this technique, a capacitor for light emission is charged at a battery checking time. A sum of the charging voltage and the voltage of a power source is applied to the light emitting element at a light emitting time.

Concretely, a device shown in the above Japanese Patent Application Laying Open (KOKAI) No. 63-171313 has a direct current power source and a first series circuit constructed by a capacitor for light emission and a dummy load for battery check connected to this direct current power source. This device also has a capacitor forming a stabilizing power source and connected in parallel to this first series circuit through first switching means. This device also has second switching means interposed between one end of the direct current power source and a connection point of the capacitor for light emission and the dummy load for battery check. This device further has a second series circuit composed of third switching means and a light emitting element interposed between the other end of the direct current power source and a side point opposite to the connection point of the capacitor for light emission. When a battery is checked, the first and second switching means are closed and the capacitor for forming the stabilizing power source is charged by a sum of the voltage obtained by the direct current power source and the charging voltage of the capacitor for light emission. At a distance measuring time, the second and third switching means are closed and the above voltage sum is applied to the light emitting element.

(3) A high output is stably obtained by operating the light emitting element with a constant electric current.

For example, Japanese Patent Application Laying Open (KOKAI) No. 62-156631 shows a technique for operating the light emitting element with a constant electric current. In this technique, the light emitting element is operated with a constant electric current in accordance with a charging voltage of a capacitor for light emission.

Further, Japanese Patent Application Laying Open (KOKAI) No. 1-199109 shows that reliable measured distance information is obtained by emitting light from the light emitting element plural times.

However, the above-mentioned general methods have the following disadvantages.

In the above method (1) for increasing the direct current voltage, cost of parts for increasing this direct current voltage is taken and a wide space for mounting these parts is required. Useless energy is consumed to increase the direct current voltage. Further, it takes time to set the direct current voltage to a predetermined voltage. Accordingly, this method is not suitable for a case in which a distance measuring operation is performed by continuously emitting light from the light emitting element as in the synchronous detecting system.

In the above method (2) using the voltage doubler circuit, there is a problem in that no electric current flowing through the light emitting element is constant. Further, a voltage of the capacitor for light emission depends on a voltage of the direct current power source for charging this capacitor.

Therefore, it is difficult to stably obtain a high output in a wide range of the power source voltage.

In the above method (3) using a constant current operation of the light emitting element, no predetermined electric current can flow through the light emitting element when light is emitted from the light emitting element under a worst condition of the direct current power source (when an internal resistance of the direct current power source is increased with low voltage in a low temperature environment, etc.).

SUMMARY OF THE INVENTION

It is therefore an object of the present invention to provide a range finder for obtaining measured distance information by emitting light to a photographed subject and detecting reflected light from this photographed subject in synchronization with the light emission so that light can be stably and suitably emitted from a light emitting element and a measured distance can be obtained with high precision by sufficiently fulfilling performance of the light emitting element even in a power source of a low voltage and efficiently emitting this light with a stable light amount even when the power source voltage is reduced.

In accordance with a first construction of the present invention, the above object can be achieved by a range finder for obtaining measured distance information by emitting light to a photographed subject and detecting reflected light from the photographed subject in synchronization with the light emission;

the range finder comprising:
a direct current power source of a low voltage;
a series circuit constructed by a light emitting element and a capacitor for light emission;
first and second switching means respectively connected between both ends of the direct current power source and the series circuit constructed by the light emitting element and the capacitor for light emission;
the first and second switching means being simultaneously turned on so that a discharging electric current flows from the capacitor for light emission in a first direction;
third and fourth switching means respectively connected between both the ends of the direct current power source and the capacitor for light emission of the series circuit;
the third and fourth switching means being simultaneously turned on so that a charging electric current flows to the capacitor for light emission in a second direction different from the first direction;
constant current control means for operating the series circuit of the light emitting element and the capacitor for light emission with a constant electric current when the first and second switching means are turned on; and
light emitting control means for charging the capacitor for light emission by turning off the first and second switching means and turning on the third and fourth switching means before light is emitted from the light emitting element;
the light emitting control means applying a sum of a charging voltage of the capacitor for light emission and a voltage of the direct current power source to the light emitting element by turning on the first and second switching means and turning off the third and fourth switching means when light is emitted from the light emitting element; and the light emitting control means emitting light from the light emitting element with a constant electric current provided by the constant current control means.

In accordance with a second construction of the present invention, the constant current control means is constructed such that at least one of the first and second switching means has constant current characteristics.

In accordance with a third construction of the present invention, the constant current control means is constructed such that one of the first and second switching means is constructed by a first transistor;

the constant current control means is constructed by a constant current circuit comprising:
a constant voltage element connected between a base of the first transistor and one end of the direct current power source of a low voltage;
an emitter resistance connected between an emitter of the first transistor and the one end of the direct current power source;
a second transistor for drive for controlling an electric current supplied to the constant voltage element; and
a resistance for limiting the electric current of the constant voltage element.

In accordance with a fourth construction of the present invention, the constant current circuit has a direct current power source of a constant voltage different from the direct current power source of a low voltage and connected to the second transistor so as to flow a constant electric current through the constant voltage element.

In accordance with a fifth construction of the present invention, the range finder further comprises temperature compensating means for controlling a voltage of the direct current power source of a constant voltage so as to cancel a change in voltage caused by a change in temperature of the constant voltage element.

In accordance with a sixth construction of the present invention, the constant current control means is constructed such that one of the first and second switching means is constructed by a first transistor;

the constant current control means is constructed by a constant current circuit comprising:
a constant voltage element connected between a base of the first transistor and one end of the direct current power source of a low voltage;
an emitter resistance connected between an emitter of the first transistor and the one end of the direct current power source; and
constant current means for constantly controlling an electric current supplied to the constant voltage element.

In accordance with a seventh construction of the present invention, the constant current means has a field effect transistor of a depletion type and a resistor for current limitation connected between a source and a gate of the field effect transistor.

In accordance with an eighth construction of the present invention, the resistor for current limitation has temperature characteristics for canceling a change in temperature of the constant voltage element.

In accordance with a ninth construction of the present invention, the constant voltage element is constructed by plural diodes and the resistor for current limitation is constructed by a thermistor.

In accordance with a tenth construction of the present invention, the constant voltage element is constructed by plural diodes and the resistor for current limitation is constructed by a series circuit of a thermistor and a resistor.

In accordance with an eleventh construction of the present invention, the constant current control means is constructed such that one of the first and second switching means is constructed by a first transistor;

the constant current control means is constructed by a constant current circuit comprising:
a resistor for a constant voltage connected between a base of the first transistor and one end of the direct current power source of a low voltage;
an emitter resistance connected between an emitter of the first transistor and the one end of the direct current power source; and
constant current means for constantly controlling an electric current supplied to the resistor for a constant voltage.

In the above range finder, the capacitor for light emission iS charged by turning off the first and second switching means and turning on the third and fourth switching means before light is emitted from the light emitting element. A sum of a charging voltage of the capacitor for light emission and a voltage of the direct current power source is applied to the light emitting element by turning on the first and second switching means and turning off the third and fourth switching means when light is emitted from the light emitting element. Light is emitted from the light emitting element with a constant electric current provided by the constant current control means. Thus, the light emitting element is operated with a double voltage and a constant electric current.

Accordingly, performance of the light emitting element is sufficiently fulfilled even when the power source has a low voltage. Further, a stable light amount is efficiently emitted from the light emitting element even when the voltage of the power source is reduced. Accordingly, light can be stably and suitably emitted from the light emitting element. Thus, the range finder can obtain a high distance measuring accuracy.

Further, it is not necessary to use an expensive integrated circuit having a port for operating the light emitting element with a constant electric current in control thereof.

The power source of the light emitting element is separated from that of the constant current circuit. Accordingly, no voltage of the constant voltage element is changed even when the power source voltage of the light emitting element is varied. Therefore, the constant current control of the light emitting element can be performed.

The constant current control of the light emitting element is realized irrespective of temperature by compensating a change in temperature of the constant voltage element.

The constant current control of the light emitting element can be performed irrespective of the power source voltage by flowing a constant electric current through the constant voltage element irrespective of the power source voltage.

Further, the constant current control of the light emitting element is realized irrespective of temperature by compensating a change in temperature of a diode.

Further objects and advantages of the present invention will be apparent from the following description of the preferred embodiments of the present invention as illustrated in the accompanying drawings.

DESCRIPTION OF THE PREFERRED EMBODIMENTS

The preferred embodiments of a range finder in the present invention will next be described concretely with reference to the accompanying drawings.

Figure 1:
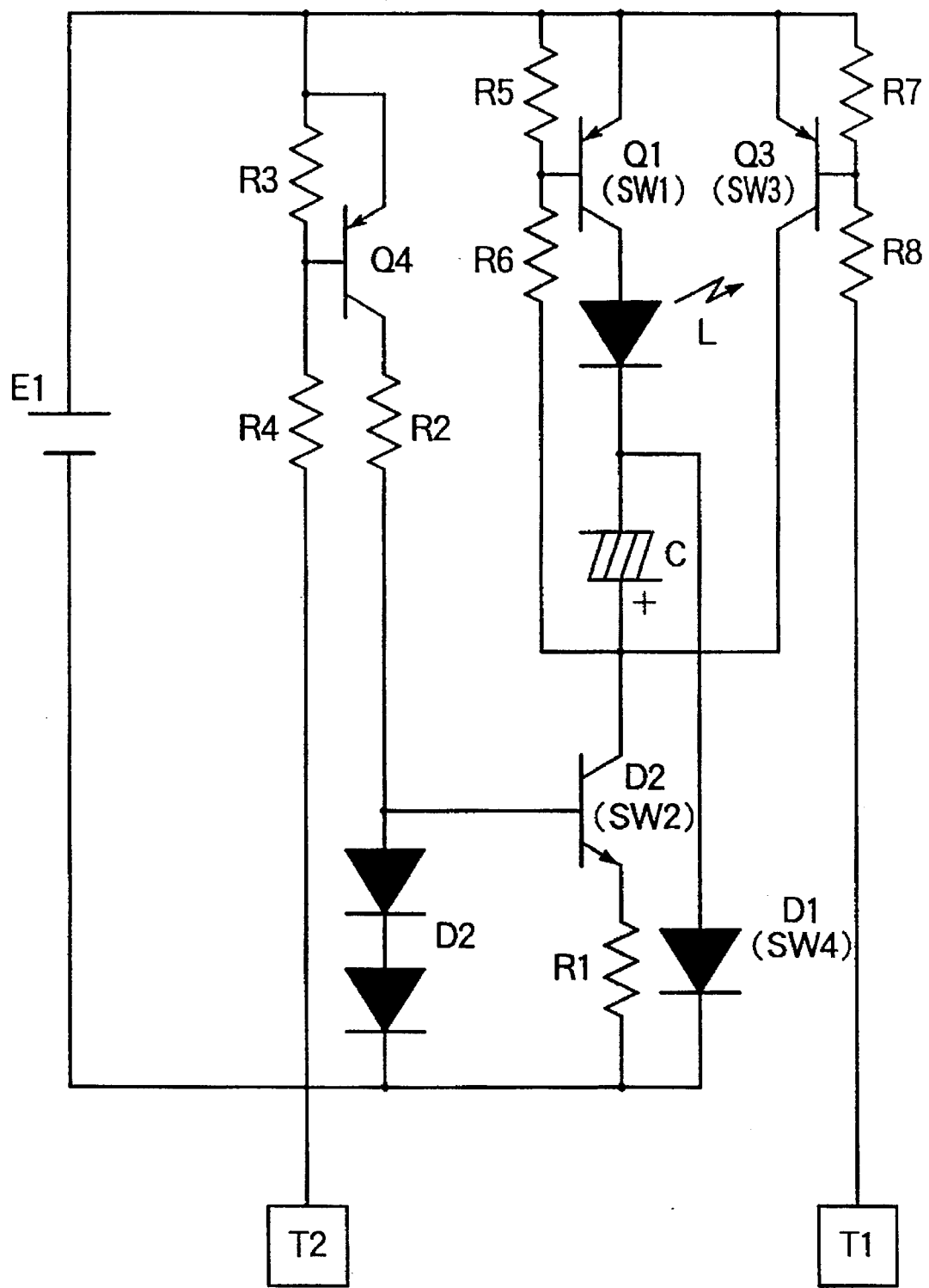
FIG. 1 is a circuit diagram showing the construction of a main portion of a range finder in accordance with a first embodiment of the present invention.

FIG. 1 is a circuit diagram showing the construction of a main portion of a range finder in accordance with a first embodiment of the present invention.

The range finder shown in FIG. 1 has a direct current power source E1, a light emitting diode L, a capacitor C for light emission, transistors Q1 to Q4, diodes D1, D2, and resistors R1 to R8.

The transistors Q1, Q2 and Q3 respectively constitute switching elements SW1, SW2 and SW3 as first to third switching means. The diode D1 constitutes a fourth switching element SW4. For example, the diode D2 is constructed by two diodes connected in series to each other and constitutes a constant voltage element.

The diode D2 constituting this constant voltage element can be constructed by one diode or plural diodes connected in series to each other so as to obtain a desirable voltage. For example, the light emitting diode L is constructed by an infrared light emitting diode and constitutes a light emitting element. A charging signal and a light emitting signal are respectively provided from unillustrated control circuits to a charging control terminal T1 and a light emitting control terminal T2.

The direct current power source E1 has a low voltage. In this case, the direct current power source E1 is constructed by a battery. The light emitting diode L as the light emitting element and the capacitor C for light emission are connected in series to each other so that a series circuit is formed.

The transistor Q1 as the first switching element SW1 is connected between the light emitting diode L and one end of the direct current power source E1, i.e., a positive side thereof. The transistor Q2 as the second switching element SW2 is connected between the capacitor C for light emission and the other end of the direct current power source E1, i.e., a negative side (a common ground side) thereof.

More concretely, an emitter of the transistor Q1 is connected to the positive side of the direct current power source E1. A collector of the transistor Q1 is connected to an anode of the light emitting diode L. A collector of the transistor Q2 is connected to the capacitor C for light emission. An emitter of the transistor Q2 is connected to the negative side of the direct current power source E1 through a resistor R1. A resistor R5 is connected between the emitter and a base of the transistor Q1. A resistor R6 is connected between the base of the transistor Q1 and the collector of the transistor Q2 The diode D2 as a constant voltage element having a polarity shown in FIG. 1 is connected between a base of the transistor Q2 and the negative side of the direct current power source E1.

The transistors Q1 and Q2 are simultaneously turned on so that charged charges of the capacitor C for light emission are discharged in a forward direction of the light emitting diode L as a first direction. The transistor Q3 as the third switching element SW3 is connected between the capacitor C for light emission and one end of the direct current power source E1, i.e., the positive side thereof. The diode D1 as the fourth switching element SW4 is connected between the capacitor C for light emission and the other end of the direct current power source E1, i.e., the negative side thereof.

More concretely, an emitter of the transistor Q3 is connected to the positive side of the direct current power source E1. A collector of the transistor Q3 is connected to a connection point between the capacitor C for light emission and the collector of the transistor Q2. An anode of the diode D1 is connected to a connection point between the capacitor C for light emission and a cathode of the light emitting diode L. A cathode of the diode D1 is connected to the negative side of the direct current power source E1. A resistor R7 is connected between the emitter and a base of the transistor Q3. The base of the transistor Q3 is connected to a charging control terminal T1 through a resistor R8.

The transistor Q3 and the diode D1 are simultaneously turned on so that a charging electric current flows through the capacitor C for light emission in a second direction.

The transistor Q4 as a second transistor for drive is connected between the positive side of the direct current power source E1 and an anode of the diode D2. The anode of the diode D2 is connected to the base of the transistor Q2.

Namely, an emitter of the transistor Q4 is connected to the positive side of the direct current power source E1. A collector of the transistor Q4 is connected to the anode of the diode D2 through a resistor R2. A resistor R3 is connected between the emitter and a base of the transistor Q4. The base of the transistor Q4 is connected to a light emitting control terminal T2 through a resistor R4.

The transistors Q2, Q4 and the diode D2 constitute a constant current control circuit for operating the series circuit of the light emitting diode L and the capacitor C for light emission with a constant electric current.

Before light is emitted from the light emitting diode L, an unillustrated light emitting control section provides a charging signal to the charging control terminal T1 so that the transistors Q1 and Q2 are turned off and the transistor Q3 and the diode D1 are turned on. Thus, the capacitor C for light emission is charged. When light is emitted from the light emitting diode L, the light emitting control section provides a light emitting signal to the light emitting control terminal T2 so that the transistors Q1 and Q2 are turned on and the transistor Q3 and the diode D1 are turned off. Thus, a sum of the charging voltage of the capacitor C for light emission and a voltage of the direct current power source E1 is applied to the light emitting diode L. Further, light is emitted from the light emitting diode L with a constant electric current provided by the above constant current control circuit.

An operation of the range finder having the above construction will next be explained in detail with reference to a timing chart shown in FIG. 2.

Figure 2:
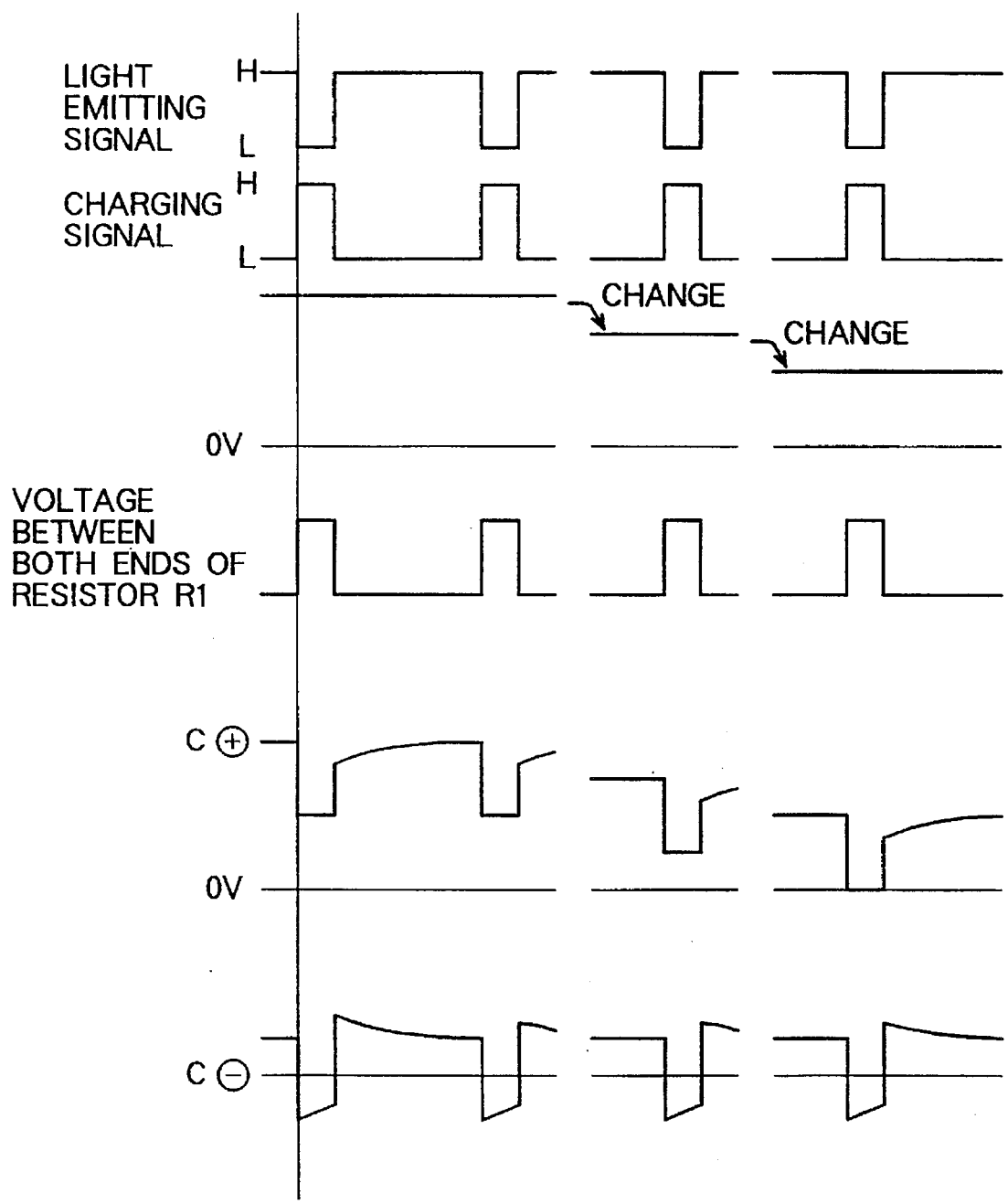
FIG. 2 is a timing chart for explaining an operation of the range finder shown in FIG. 1.

FIG. 2 shows waveforms of a light emitting signal supplied to the light emitting control terminal T2, waveforms of a charging signal supplied to the charging control terminal T1, and waveforms of a terminal voltage of the direct current power source E1 composed of a battery. FIG. 2 also shows waveforms of a voltage (proportional to a light emitting amount of the light emitting diode L as a light emitting element) between terminals of the resistor R1, and waveforms of plus and minus side potentials of the capacitor C for light emission.

When a distance measuring operation is started, the transistor Q3 as the third switching element SW3 is turned on by a charging signal (as a low voltage active signal "L") provided to the charging control terminal T1. Further, the diode D1 as the fourth switching element SW4 is also turned on. Thus, the capacitor C for light emission begins to be charged. At this time, the transistors Q1 and Q2 as the first and second switching elements SW1 and SW2 are turned off by a light emitting signal provided to the light emitting control terminal T2. The capacitor C for light emission is rapidly charged by the transistor Q3.

When the capacitor C for light emission has been rapidly charged completely, the transistors Q1 and Q2 as the first and second switching elements SW1 and SW2 are turned on by the light emitting signal (a low voltage active signal "L") provided to the light emitting control terminal T2. Further, the transistor Q3 and the diode D1 as the third and fourth switching elements SW3 and SW4 are turned off by the charging signal provided to the charging control terminal T1. Thus, a sum of the charging voltage of the capacitor C for light emission and a voltage of the direct current power source E1 is applied to the light emitting diode L as the light emitting element.

The light emitting diode L emits light by this voltage so that this light is emitted to a photographed subject. At this time, an electric current flowing through the light emitting diode L is controlled as a constant electric current by the transistor Q2 as the second switching element SW2. Accordingly, the capacitor C for light emission is also discharged constantly so that a light emitting amount of the light emitting diode L is stable.

Light reflected on the photographed subject is detected in synchronization with the light emission of the light emitting diode L so that a distance from the photographed subject is measured. Lenses of a camera, etc. are moved on the basis of measured results of this distance so that automatic focus control is performed.

Accordingly, a generating amount of noises is small and high energy can be obtained for a short time and light can be continuously emitted from the light emitting element. Further, the constant electric current control is performed by the transistor Q2 as the switching element SW2 so that a construction for the constant electric current control is simplified.

The voltage applied to the light emitting diode L is a sum of the charging voltage of the capacitor C for light emission and the voltage of the direct current power source E1. Accordingly, as shown in FIG. 2, the voltage applied to the light emitting diode L can be set to be high even when the voltage of the direct current power source E1 is reduced by consumption of the battery. Therefore, no light emitting amount of the light emitting diode L is changed. Accordingly, a high output can be stably obtained in a wide voltage range of the direct current power source E1.

The emitter resistance R1 is connected between the emitter of the transistor Q2 and the negative side of the direct current power source E1. The diode D2 as a constant voltage element is connected between the base of the transistor Q2 and the negative side of the direct current power source E1. Accordingly, an electric current flowing through the diode D2 as a constant voltage element can be constantly held irrespective of the voltage of the direct current power source E1 so that preferable constant voltage characteristics can be obtained. Further, the transistor Q4 for controlling light emission can be directly connected to the direct current power source E1.

It is sufficient to provide constant electric current characteristics for one of the transistors Q1 and Q2 respectively constituting the first and second switching elements SW1 and SW2. However, it is easy to restrain a change in base potential of the transistor Q2 as the second switching element SW2 as in the above construction of FIG. 1. Accordingly, it is desirable to construct the range finder such that the transistor Q2 has the constant electric current characteristics.

The third switching element SW3 can be constructed by using a resistor instead of the transistor Q3. However, it is desirable to use the transistor Q3 as the third switching element SW3 so as to rapidly charge the capacitor C for light emission and so as not to flow an excessive electric current through the light emitting diode L as a light emitting element during light emission.

The fourth switching element SW4 can be constructed by using a transistor or a resistor instead of the diode D1. However, it is desirable to use the diode D1 as the fourth switching element SW4 since the fourth switching element SW4 can be constructed by one part and no minus side terminal of the capacitor is electrically connected to the ground during the light emission of the light emitting diode L as a light emitting element.

Figure 3:
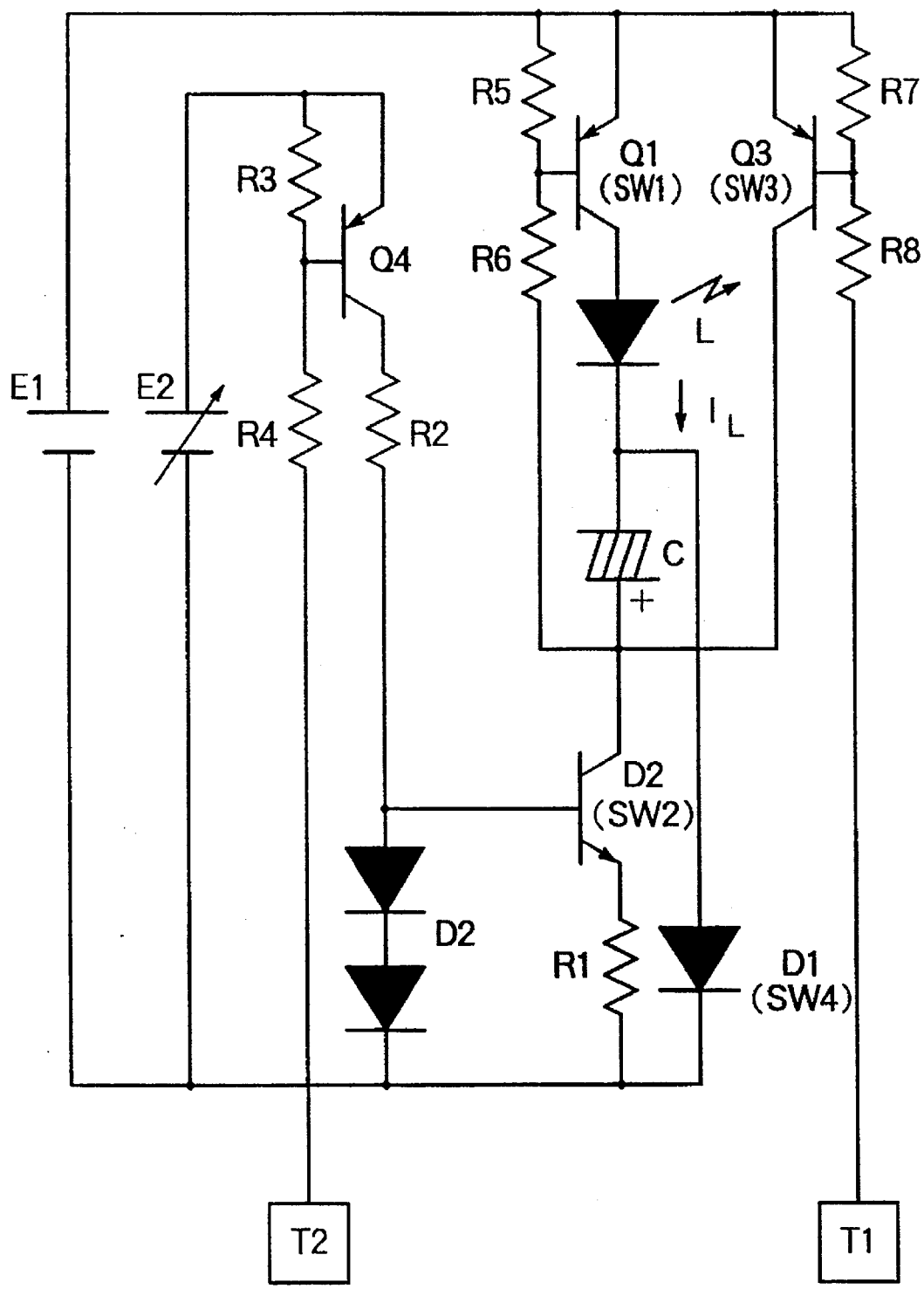
FIG. 3 is a circuit diagram showing the construction of a main portion of a range finder in accordance with a second embodiment of the present invention.

FIG. 3 is a circuit diagram showing the construction of a main portion of a range finder in accordance with a second embodiment of the present invention.

In FIG. 3, constructional portions similar to those in FIG. 1 are designated by the same reference numerals and a detailed explanation thereof is omitted in the following description.

The range finder shown in FIG. 3 has a second low voltage direct current power source E2 separated from a first direct current power source E1 and capable of performing a voltage control operation.

One end of a resistor R3 is connected to a base of a transistor Q4. An emitter of the transistor Q4 and the other end of the resistor R3 are not connected to a positive side of the first direct current power source E1, but are connected to a positive side of the second direct current power source E2.

For example, a constant voltage output port arranged in a central processing unit (CPU) for camera control is used as the second direct current power source E2. A negative side (a common ground side) of the second direct current power source E2 is connected to a negative side (a common ground side) of the first direct current power source E1.

In this case, a constant current control circuit for operating a series circuit of a light emitting diode L and a capacitor C for light emission with a constant electric current is constructed by the transistor Q4, a diode D2, resistors R1, R2 and the second direct current power source E2.

In the following description, $V_{BE}$ is set to a voltage between a base and an emitter of the transistor Q2. $V_F$ is set to a voltage generated between both ends of the diode D2. R1 is set to a resistance value of the resistor R1. In this case, an electric current $I_L$ flowing through the light emitting diode L as a light emitting element is determined by the following formula.

$$I_L=(V_F-V_{BE})/R1$$

A constant voltage element is desirably constructed by the diode D2 composed of one or more diodes. This constant voltage element can be also constructed by a resistor, a constant voltage diode, etc.

When the constant voltage element is constructed by a resistor, the following problems are caused.

Namely, a resistance value of the resistor R2 is set to be small so as to flow a large amount of base electric current of the transistor Q2 to a certain extent. In contrast to this, when a voltage generated by this resistor R2 is set to be excessively high, a voltage generated by a voltage doubler becomes meaningless. Accordingly, the resistance value of the resistor R2 is also set to be small in view of this voltage.

Thus, it is necessary to set the second direct current power source E2 and the transistor Q4 such that no electric characteristics of each of the second direct current power source E2 and the transistor Q4 are changed even when a large electric current flows through each of the second direct current power source E2 and the transistor Q4 to a certain extent.

When the constant voltage element is constructed by a constant voltage diode, a voltage of the constant voltage diode is greatly changed by a change in electric current. Further, similar to the case of the above resistor, the voltage doubler becomes meaningless when a voltage value of the constant voltage diode is set to be excessively large.

Accordingly, it is desirable to use a diode as the constant voltage element for the above reasons.

In such a construction, the diode D2 as the constant voltage element can be operated with a constant electric current so that constant voltage characteristics can be improved. Accordingly, constant current characteristics of the above constant current control circuit can be improved.

The voltage $V_F$ generated by the diode D2 is varied by temperature. Accordingly, if a voltage of the above second direct current power source E2 is controlled such that this voltage is changed in accordance with an ambient temperature, an electric current flowing through the diode D2 is changed so that the voltage $V_F$ generated by the diode D2 can be constantly held.

Figure 4:
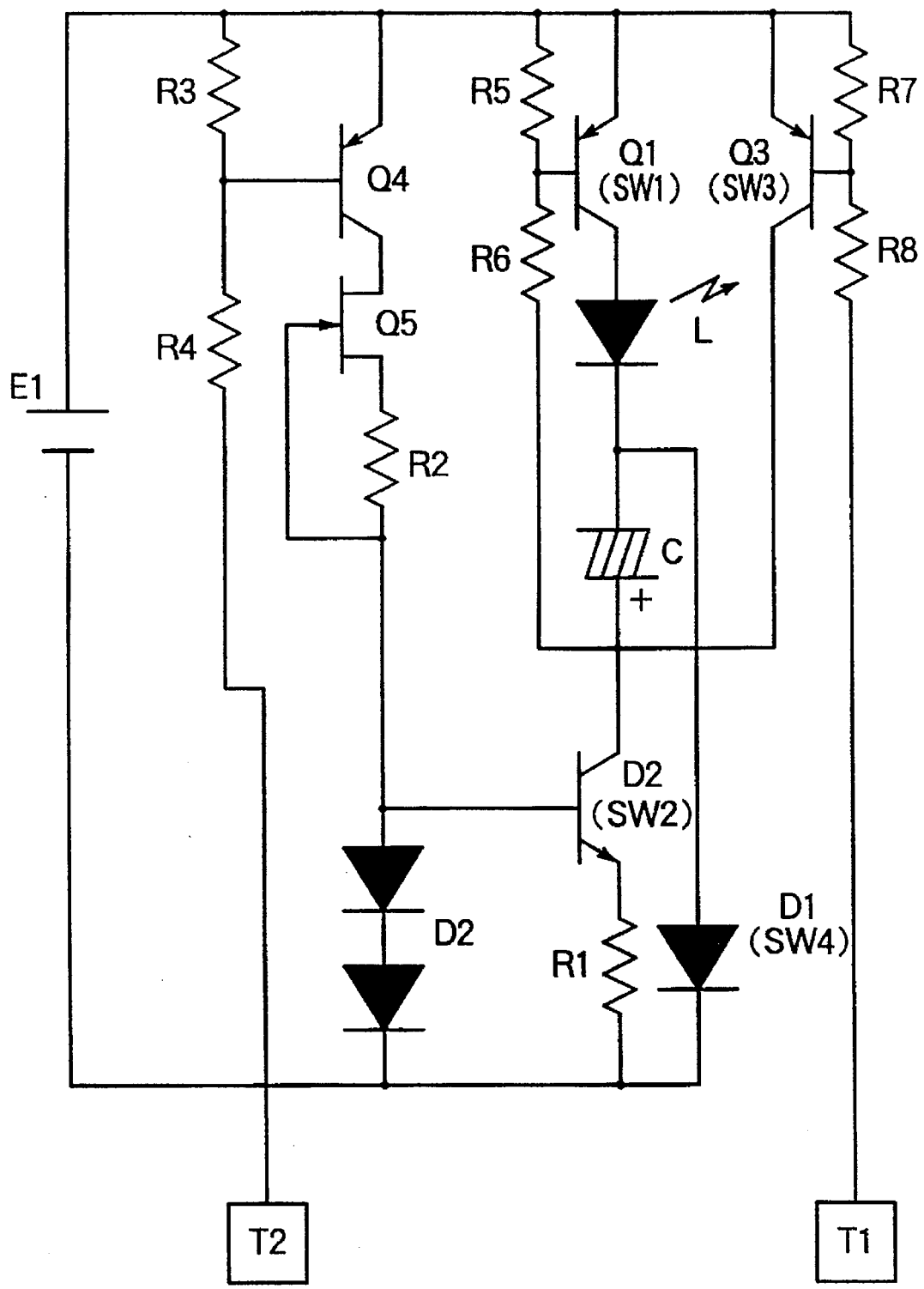
FIG. 4 is a circuit diagram showing the construction of a main portion of a range finder in accordance with a third embodiment of the present invention.

FIG. 4 is a circuit diagram showing the construction of a main portion of a range finder in accordance with a third embodiment of the present invention. In FIG. 4, constructional portions similar to those in FIG. 1 are designated by the same reference numerals and a detailed explanation thereof is omitted in the following description.

In the range finder shown in FIG. 4, a source-drain circuit of a field effect transistor (FET) Q5 is connected between the collector of a transistor Q4 and one end of a resistor R2 for current limitation. A gate of the FET Q5 is connected to a connection point between the other end of the resistor R2 and a diode D2.

In this case, an electric current flowing through the diode D2 as a constant voltage element is set to be constant by a feedback circuit constructed by the FET Q5 and the resistor R2. No second direct current power source E2 shown in FIG. 2 is required to constantly hold a voltage generated in the diode D2.

Accordingly, constant current characteristics for operating a series circuit constructed by a light emitting diode L and a capacitor C for light emission can be improved by a simple construction.

The FET Q5 is of a depletion type. In this type, a drain electric current of the FET Q5 can flow even when a gate voltage is equal to zero.

Further, in this type, a control operation of the FET can be performed by adding the gate voltage even in a reducing direction of a channel.

Figure 5:
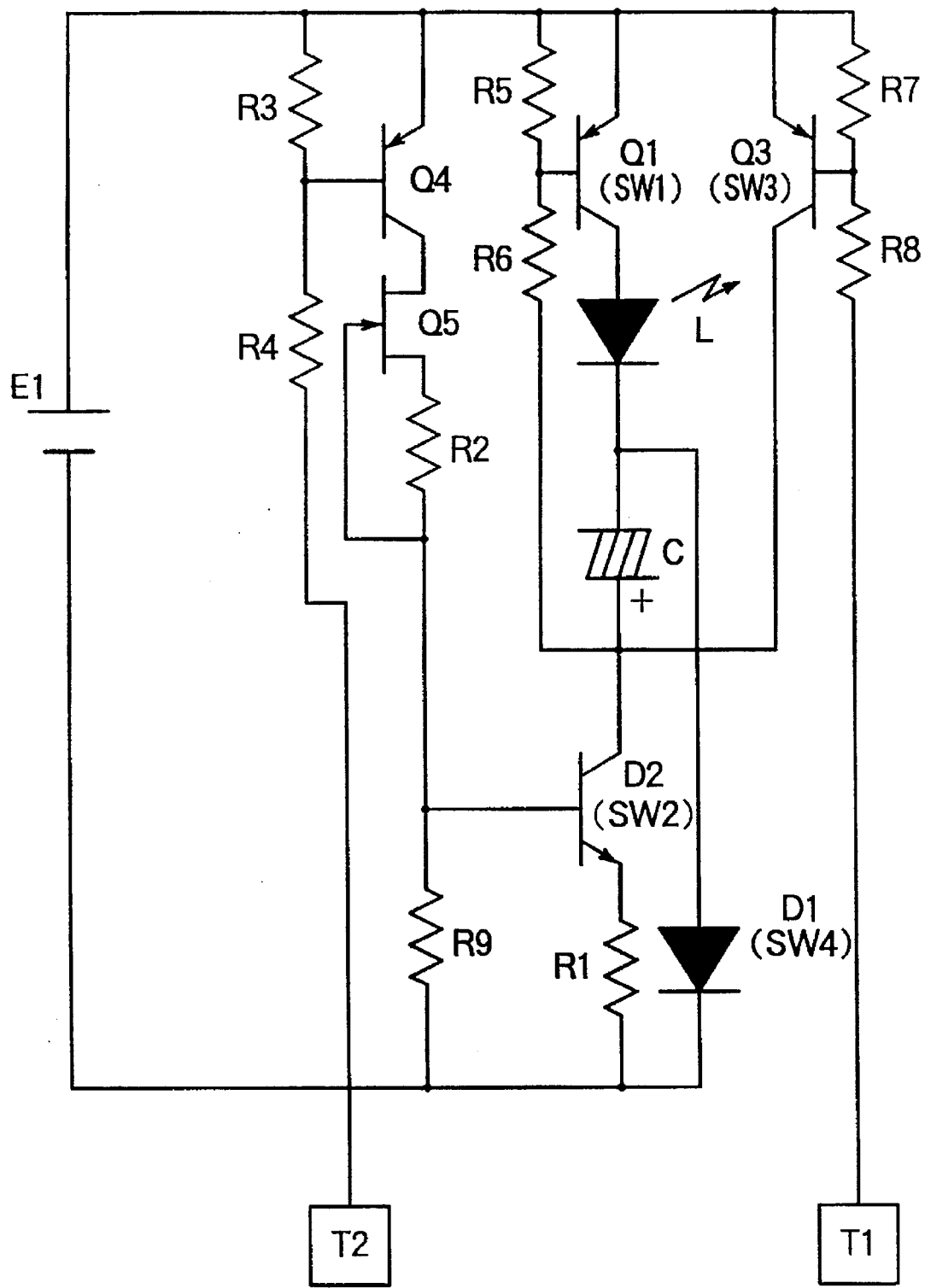
FIG. 5 is a circuit diagram showing the construction of a main portion of a range finder in accordance with a fourth embodiment of the present invention.

FIG. 5 is a circuit diagram showing the construction of a main portion of a range finder in accordance with a fourth embodiment of the present invention.

In FIG. 5, constructional portions similar to those in FIG. 4 are designated by the same reference numerals and a detailed explanation thereof is omitted in the following description.

In the range finder shown in FIG. 5, a resistor R9 is used instead of the diode D2 as a constant voltage element.

When $I_D$ is set to a drain current of an FET Q5, the base potential of a transistor Q2 is determined by a product of the drain current $I_D$ and a resistance value of the resistor R9. Therefore, the constant voltage element can be constructed by a resistor having small scatter between elements and able to be cheaply manufactured.

A resistor element for current limitation having temperature characteristics of canceling a change in temperature of the constant voltage element such as the diode D2, etc. may be used instead of the resistor R2 for current limitation.

A thermistor may be used as this resistor element for current limitation having temperature characteristics of canceling a change in temperature of the constant voltage element. Otherwise, a series circuit of a thermistor and a resistor may be used as this resistor element for current limitation. In this case, it is possible to obtain a range finder in which the number of parts is reduced and temperature is compensated at low cost.

The above construction can be not limited to a light emitting circuit of the range finder, but can be also used as a light source for auxiliary light of a camera, a light source for preventing red light, etc.

The present invention can be embodied in various kinds of modifications without departing from features of the present invention.

As mentioned in detail above, a first construction of the present invention resides in a range finder for obtaining measured distance information by emitting light to a photographed subject and detecting reflected light from the photographed subject in synchronization with the light emission. This range finder comprises:

a direct current power source of a low voltage;

a series circuit constructed by a light emitting element and a capacitor for light emission;

first and second switching means respectively connected between both ends of the direct current power source and the series circuit constructed by the light emitting element and the capacitor for light emission;

the first and second switching means being simultaneously turned on so that a discharging electric current flows from the capacitor for light emission in a first direction;

third and fourth switching means respectively connected between both the ends of the direct current power source and the capacitor for light emission of the series circuit;

the third and fourth switching means being simultaneously turned on so that a charging electric current flows to the capacitor for light emission in a second direction different from the first direction;

constant current control means for operating the series circuit of the light emitting element and the capacitor for light emission with a constant electric current when the first and second switching means are turned on; and light emitting control means for charging the capacitor for light emission by turning off the first and second switching means and turning on the third and fourth switching means before light is emitted from the light emitting element;

the light emitting control means applying a sum of a charging voltage of the capacitor for light emission and a voltage of the direct current power source to the light emitting element by turning on the first and second switching means and turning off the third and fourth switching means when light is emitted from the light emitting element; and the light emitting control means emitting light from the light emitting element with a constant electric current provided by the constant current control means.

The above light emitting element is operated with a double voltage and a constant current. Accordingly, performance of the light emitting element is sufficiently fulfilled even when the power source has a low voltage. Further, a stable light amount is efficiently emitted from the light emitting element even when the voltage of the power source is reduced. Accordingly, light can be stably and suitably emitted from the light emitting element in a wide range of the power source voltage. Thus, it is possible to provide a range finder having a high distance measuring accuracy.

In accordance with second and third constructions of the present invention, each of the first and second switching means within the range finder has constant current characteristics. A constant current circuit is constructed by a minimized number of parts so that cost of the range finder can be reduced.

In accordance with a fourth construction of the present invention, the constant current characteristics of the constant current circuit can be improved.

In accordance with a fifth construction of the present invention, the constant current characteristics of the constant current circuit can be stably held with respect to a change in temperature.

In accordance with a sixth construction of the present invention, an electric current flowing through a constant voltage element can be constantly held irrespective of the power source voltage. Therefore, a transistor for drive can be directly connected to the direct current power source having a low voltage. Accordingly, it is not necessary to use a direct current power source separated from the direct current power source having a low voltage.

In accordance with a seventh construction of the present invention, the constant current circuit can be constructed by a small number of parts.

In accordance with an eighth construction of the present invention, constant voltage characteristics can be stably obtained with respect to a change in temperature without using a direct current power source separated from the direct current power source having a low voltage.

In accordance with each of ninth and tenth constructions of the present invention, a temperature compensating circuit can be constructed by a minimized number of parts without using a second variable direct current power source separated from the direct current power source having a low voltage. The temperature compensating circuit can be also constructed by a minimized number of parts without using an integrated circuit for obtaining temperature information. Accordingly, cost of the range finder can be reduced.

In accordance with an eleventh construction of the present invention, an electric current flowing through a resistor for a constant voltage is constantly held even when the power source voltage is varied. Accordingly, a resistor cheaply manufactured can be used without using a relatively expensive constant voltage element such as a diode so that cost of the range finder can be reduced.

Many widely different embodiments of the present invention may be constructed without departing from the spirit and scope of the present invention. It should be understood that the present invention is not limited to the specific embodiments described in the specification, except as defined in the appended claims.

What is claimed is:

1. A range finder for obtaining measured distance information by emitting light to a photographed subject and detecting reflected light from the photographed subject in synchronization with the light emission;

the range finder comprising:
a direct current power source of a low voltage;
a series circuit constructed by a light emitting element and a capacitor for light emission;
first and second switching means respectively connected between both ends of said direct current power source and the series circuit constructed by said light emitting element and the capacitor for light emission;
the first and second switching means being simultaneously turned on so that a discharging electric current flows from said capacitor for light emission in a first direction;
third and fourth switching means respectively connected between both the ends of said direct current power source and the capacitor for light emission of said series circuit;
the third and fourth switching means being simultaneously turned on so that a charging electric current flows to said capacitor for light emission in a second direction different from said first direction;
constant current control means for operating the series circuit of the light emitting element and the capacitor for light emission with a constant electric current when said first and second switching means are turned on; and
light emitting control means for charging the capacitor for light emission by turning off said first and second switching means and turning on said third and fourth switching means before light is emitted from said light emitting element;
the light emitting control means applying a sum of a charging voltage of said capacitor for light emission and a voltage of said direct current power source to said light emitting element by turning on said first and second switching means and turning off said third and fourth switching means when light is emitted from said light emitting element; and
the light emitting control means emitting light from said light emitting element with a constant electric current provided by said constant current control means.

2. A range finder as claimed in claim 1, wherein the constant current control means is constructed such that at least one of the first and second switching means has constant current characteristics.

3. A range finder as claimed in claim 2, wherein the constant current control means is constructed such that one of the first and second switching means is constructed by a first transistor;
the constant current control means is constructed by a constant current circuit comprising:
a constant voltage element connected between a base of said first transistor and one end of the direct current power source of a low voltage;
an emitter resistance connected between an emitter of said first transistor and said one end of said direct current power source;

a second transistor for drive for controlling an electric current supplied to said constant voltage element; and
a resistance for limiting the electric current of said constant voltage element.

4. A range finder as claimed in claim 3, wherein the constant current circuit has a direct current power source of a constant voltage different from said direct current power source of a low voltage and connected to the second transistor so as to flow a constant electric current through the constant voltage element.

5. A range finder as claimed in claim 4, wherein the range finder further comprises temperature compensating means for controlling a voltage of the direct current power source of a constant voltage so as to cancel a change in voltage caused by a change in temperature of the constant voltage element.

6. A range finder as claimed in claim 2, wherein the constant current control means is constructed such that one of the first and second switching means is constructed by a first transistor;
the constant current control means is constructed by a constant current circuit comprising:
a constant voltage element connected between a base of said first transistor and one end of the direct current power source of a low voltage;
an emitter resistance connected between an emitter of said first transistor and said one end of said direct current power source; and
constant current means for constantly controlling an electric current supplied to said constant voltage element.

7. A range finder as claimed in claim 6, wherein the constant current means has a field effect transistor of a depletion type and a resistor for current limitation connected between a source and a gate of said field effect transistor.

8. A range finder as claimed in claim 4 or 6, wherein the resistor for current limitation has temperature characteristics for canceling a change in temperature of the constant voltage element.

9. A range finder as claimed in claim 8, wherein the constant voltage element is constructed by plural diodes and the resistor for current limitation is constructed by a thermistor.

10. A range finder as claimed in claim 8, wherein the constant voltage element is constructed by plural diodes and the resistor for current limitation is constructed by a series circuit of a thermistor and a resistor.

11. A range finder as claimed in claim 2, wherein the constant current control means is constructed such that one of the first and second switching means is constructed by a first transistor;
the constant current control means is constructed by a constant current circuit comprising:
a resistor for a constant voltage connected between a base of said first transistor and one end of the direct current power source of a low voltage;
an emitter resistance connected between an emitter of said first transistor and said one end of said direct current power source; and
constant current means for constantly controlling an electric current supplied to said resistor for a constant voltage.

* * * * *